Patented June 6, 1950

2,510,761

UNITED STATES PATENT OFFICE 2,510,761

DIGUANAMINES

John Kenson Simons, Toledo, Ohio, assignor to Libby-Owens-Ford Glass Company, Toledo, Ohio, a corporation of Ohio No Drawing. Application September 13, 1945, Serial No. 616,152

4 Claims. (Cl. 260—249.5)

The invention relates to novel carbon compounds that are diguanamines.

A guanamine is considered to be a derivative of a carboxylic acid in which the carboxy group is replaced by a 4,6-diamino-2-triazinyl radical. Hence a diguanamine may be considered to be a derivative of a dicarboxylic acid in which each of the two carboxy groups is replaced by a 4,6-diamino-2-triazinyl radical.

The diguanamines heretofore known has been obtainable only by methods that employ expensive starting materials and are difficult and expensive to carry out, so that the diguanamines heretofore known have been too expensive for ordinary commercial use.

The principal object of the invention is to provide a novel class of diguanamines that can be prepared by inexpensive methods from relatively cheap starting materials. More specific objects and advantages are apparent from the description, which merely discloses and illustrates the invention and is not intended to impose limitations upon the claims.

An application of the diguanamines of the present invention that is of considerable commercial importance is the use of such diguanamines in the same manner as melamine for reaction with formaldehyde to produce synthetic resins.

The novel carbon compounds of the present invention have the general formula

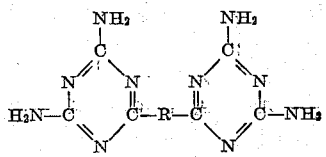

wherein —R— is a pentamethylene radical having the structural formula (a), (b) or (c), as follows:

(a) 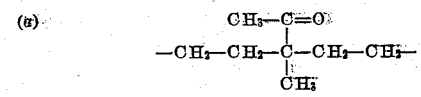

(b) 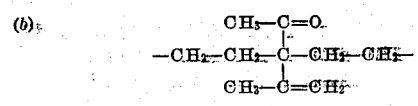

(c) 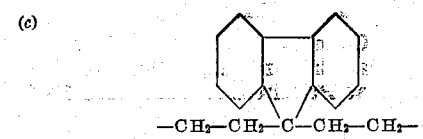

The diguanamines of the present invention are unique in that they may be produced readily and inexpensively by condensing with unsubstituted dicyandiamide the dinitrile corresponding to a dicarboxylic acid having the general formula

wherein R is the divalent radical hereinbefore described. The condensation of the dinitrile with unsubstituted dicyandiamide is carried out by dissolving a strongly basic catalyst in a suitable primary or secondary alcoholic solvent such as benzyl alcohol or ethylene glycol mono-methyl ether, adding the dinitrile and from about 2.2 to about 2.6 moles of unsubstituted dicyandiamide for each mole of the dinitrile, and heating to start the reaction. The reaction is then continued by heating or cooling if necessary to keep the temperature between about 100° and about 180° C. and to prevent the reaction from becoming too violent. The quantity of the alcoholic solvent used should be just sufficient to form a suspension of the precipitate that can be stirred during the reaction. When precipitation of the diguanamine is complete, the precipitate is filtered off and washed with boiling water to remove excess dicyandiamide and products of side reactions. The diguanamine may be purified by converting it to a hydrochloride and neutralizing an aqueous solution of the hydrochloride to liberate the diguanamine.

This method of preparation is versatile in that a large variety of dinitriles may be used for the reaction with dicyandiamide, to give a wide variety of diguanamines which, by reaction with formaldehyde, produce synthetic resins that have widely varied properties and therefore are suitable for various uses.

The dinitriles in which the cyano groups are separated by five carbon atoms in series, and in which the central carbon atom of the series is disubstituted, may be prepared by condensing acrylonitrile and a compound having an active methylene group, in the presence of a strong base.

Example 1

A solution of 288 grams of methyl ethyl ketone in 600 grams of tertiary butyl alcohol containing 20 grams of a 30 per cent methanol solution of potassium hydroxide is kept at a temperature between 0° and 5° C. and stirred for five hours during the drop-by-drop addition of 320 grams of acrylonitrile. An oily layer that separates soon solidifies. After two more hours of stirring at 5° C., the solid product is filtered off and air dried to produce an 88 per cent yield of gamma-methyl-gamma-acetyl pimelonitrile. After 33.5 grams of this product and 33.5 grams of dicyandiamide have been added to 75 grams of benzyl alcohol in which has been dissolved two grams of 85 per cent potassium hydroxide, the mixture is warmed. By the time the temperature reaches 130° C., heating is no longer necessary and exothermic reaction continues spontaneously for 15 to 20 minutes. The ingredients are then kept at 140° to 160° C. by heating for two hours longer. Then after the mixture has been cooled the solid is filtered off and washed with alcohol to produce a crude product, which may be purified by boiling it with water and filtering it off from the hot water. The purified product is a 65 per cent yield of a substance that is insoluble in water and soluble in a dilute acid and may be crystallized from benzyl alcohol, which is gamma-methyl-gamma-acetyl pimeloguanamine

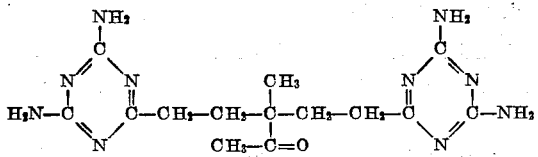

*Example 2*

A procedure is carried out that is the same as the procedure of Example 1, except that the initial ingredients are 98 grams of mesityl oxide, 100 grams of tertiary butyl alcohol, five grams of a 30 per cent aqueous solution of trimethylbenzylammonium hydroxide, and 106 grams of acrylonitrile; the intermediate product is 66 grams of gamma - isopropenyl - gamma - acetyl pimelonitrile; and the final ingredients are 51 grams of the intermediate product, 42 grams of dicyandiamide, five grams of 85 per cent potassium hydroxide and 100 grams of benzyl alcohol. The final product is 45 grams of a substance that melts at 273-4° C., which is gamma-isopropenyl-gamma-acetyl pimeloguanamine.

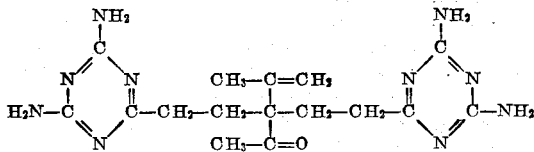

*Example 3*

A procedure is carried out that is the same as the procedure of Example 1 except that the initial ingredients are 166 grams of fluorene, 500 grams of dioxane, five grams of a 30 per cent aqueous solution of trimethylbenzyl-ammonium hydroxide, and 111 grams of acrylonitrile; the intermediate product is 60 grams of bis-cyanoethyl fluorene; and the final ingredients are 13.6 grams of the intermediate product, 8.4 grams of dicyandiamide, one gram of potassium hydroxide and 20 grams of benzyl alcohol. The final product is a 62 per cent yield of bis-(4,6-diamino-2-triazinyl-ethyl) fluorene.

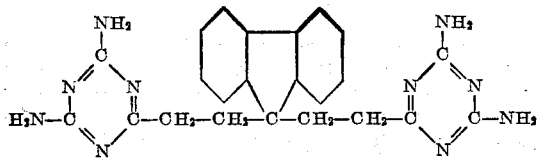

Various other compounds embodying the invention may be prepared to meet various requirements.

Having described the invention, I claim:

1. A novel carbon compound having the general formula:

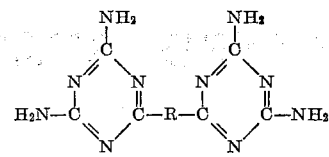

wherein —R— is a pentamethylene radical of the class consisting of (a), (b) and (c), having the following structural formulas:

(a)
$$-CH_2-CH_2-\underset{\underset{CH_3}{|}}{\overset{\overset{CH-O=O}{|}}{C}}-CH_2-CH_2-$$

(b)
$$-CH_2-CH_2-\underset{\underset{CH_3-C=CH_2}{|}}{\overset{\overset{CH_3-C=O}{|}}{C}}-CH_2-CH_2-$$

(c)

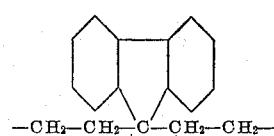

2. A novel carbon compound having the structural formula

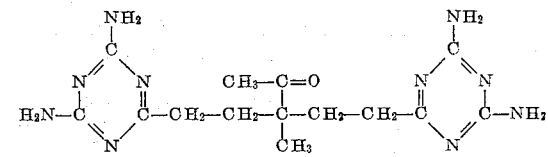

3. A novel carbon compound having the structural formula

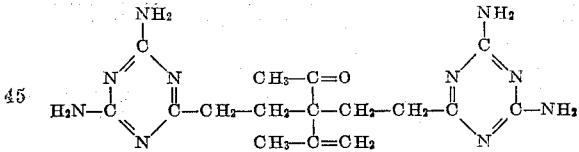

4. A novel carbon compound having the structural formula

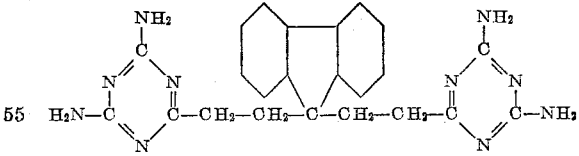

JOHN KENSON SIMONS.

REFERENCES CITED

The following references are of record in the file of this patent:

UNITED STATES PATENTS

| Number | Name | Date |
|---|---|---|
| 2,423,071 | Thurston | June 24, 1947 |
| 2,423,353 | Thurston | July 1, 1947 |
| 2,425,287 | Thurston | Aug. 5, 1947 |

FOREIGN PATENTS

| Number | Country | Date |
|---|---|---|
| 540,651 | Great Britain | Oct. 24, 1941 |
| 552,220 | Great Britain | 1943 |